United States Patent
Lovell et al.

(10) Patent No.: US 6,783,149 B2
(45) Date of Patent: Aug. 31, 2004

(54) GAS BAG MODULE

(75) Inventors: Mark Lovell, Mesa, AZ (US); Thorsten Nottebaum, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/109,284

(22) Filed: Mar. 28, 2002

(65) Prior Publication Data

US 2002/0140210 A1 Oct. 3, 2002

(30) Foreign Application Priority Data

Mar. 28, 2001 (DE) ...................... 201 05 434 U

(51) Int. Cl.[7] .............................................. B60R 21/16
(52) U.S. Cl. ................................. 280/728.2; 280/731
(58) Field of Search .......................... 280/728.2, 731, 280/728; 74/552

(56) References Cited

U.S. PATENT DOCUMENTS

| | | | |
|---|---|---|---|
| 2,128,069 A | 8/1938 | Ashby | |
| 5,356,178 A | * 10/1994 | Numata | ............ 280/777 |
| 5,410,114 A | 4/1995 | Furuie et al. | |
| 5,673,930 A | * 10/1997 | Coleman | ............ 280/728.2 |
| 5,692,768 A | 12/1997 | Mihm et al. | |
| 5,741,025 A | * 4/1998 | Meyer et al. | ............ 280/731 |
| 6,164,689 A | * 12/2000 | Rivin et al. | ............ 280/731 |
| 6,439,599 B1 | 8/2002 | Laue et al. | |
| 6,464,247 B1 | 10/2002 | Laue | |

FOREIGN PATENT DOCUMENTS

| | | |
|---|---|---|
| DE | 29816923 | 1/1999 |
| DE | 29816925 | 1/1999 |
| DE | 20016639 | 3/2001 |
| EP | 1010589 A2 | 6/2000 |
| WO | WO9746424 | 12/1997 |
| WO | WO0015470 | 3/2000 |

OTHER PUBLICATIONS

Co–pending patent Appln. Ser. No. 09/963,909, filed Sep. 26, 2001 entitled "Vehicle Steering Wheel".
U.S. Patent Appln. Ser. No. 09/954,671, filed Sep. 17, 2001 entitled "Steering Wheel".

* cited by examiner

Primary Examiner—Eric Culbreth
(74) Attorney, Agent, or Firm—Tarolli, Sundheim, Covell & Tummino L.L.P.

(57) ABSTRACT

The invention relates to a gas bag module of several components, which comprise a least a carrier element, a gas generator and a gas bag. At least one elastic element is provided and at least one of the components is mounted in the gas bag module so as to be neutralized with regard to vibration by means of the at least one elastic element consisting of silicone.

5 Claims, 2 Drawing Sheets

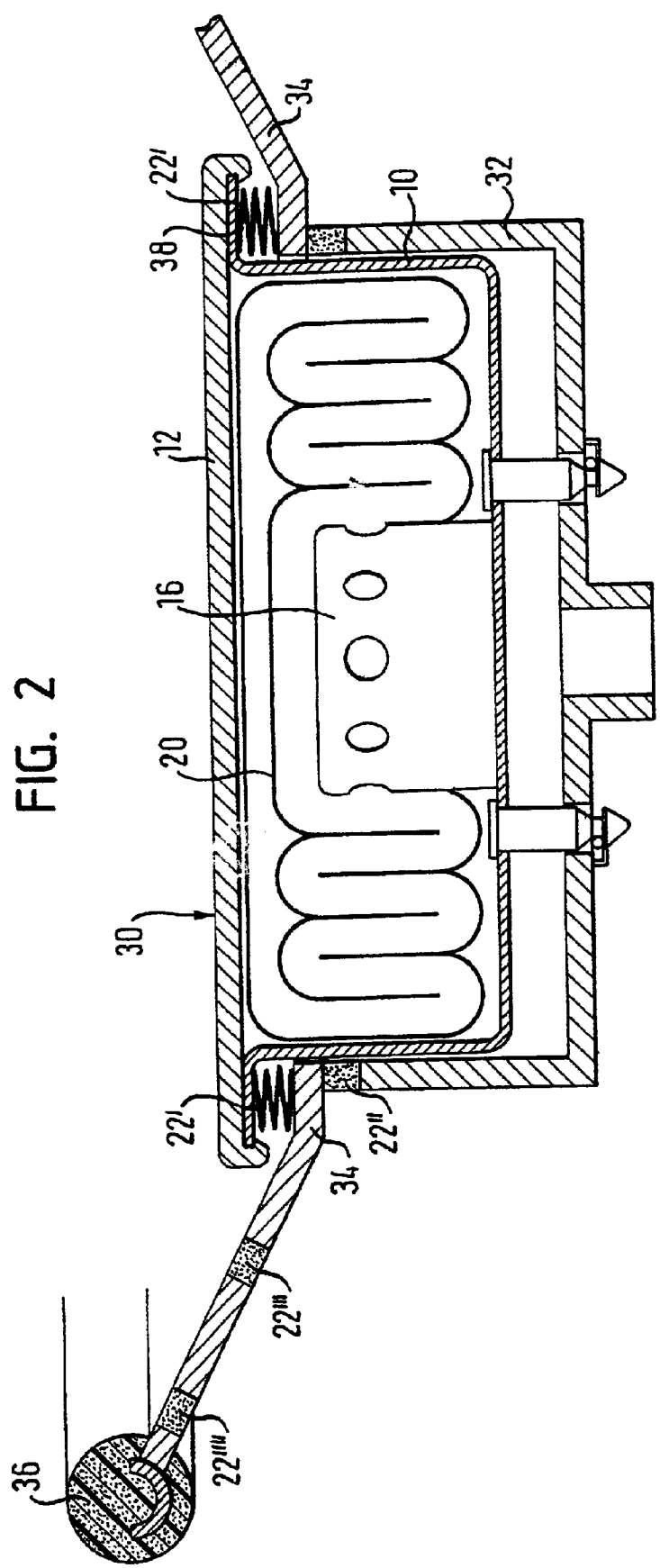

GAS BAG MODULE

TECHNICAL FIELD

The invention relates to a gas bag module.

BACKGROUND OF THE INVENTION

Known gas bag modules usually consist of several components, in particular of a gas bag, a gas generator and a carrier element, and are provided for incorporation into a steering wheel. The carrier element can, for example, be a holding plate for the gas bag module or the housing of the module, in which the gas generator and the gas bag are arranged. Numerous steering wheel gas bag modules have been proposed, in which components of the module are mounted so as to be neutralized with regard to vibration from the remainder of the module, or act in a damping manner with regard to vibration for the steering wheel, so that the vibrations on the steering wheel rim are damped. The components are usually mounted here on or in plastic rings which hitherto consist of styrene butadiene or of ethylene propylene terpolymers. The mountings of plastic hitherto are designed for being used at a temperature of 20 degrees Celsius. This means that the damping frequency in this temperature range corresponds as exactly as possible to the frequency of excitation.

BRIEF SUMMARY OF THE INVENTION

The object of the invention consists in making available a gas bag module which has a mounting for the component that is neutralized with regard to vibration with as uniform a damping frequency as possible, over the entire temperature range of −40 to +85 degrees Celsius.

This is achieved in a gas bag module of several components, which comprise a least a carrier element, a gas generator and a gas bag. At least one elastic element is provided and at least one of the components is mounted in the gas bag module so as to be neutralized with regard to vibration by means of the at least one elastic element consisting of silicone. Silicone was not used hitherto for the mounting of components in the gas bag module, because it is, to a certain extent, difficult to handle and appeared to be unsuitable for the mounting of components which heat up intensively and also difficult with regard to the nature of application of parts on the silicone. However, tests have surprisingly shown that the above-mentioned difficulties can be overcome and silicone also comes into consideration as a supporting material in the case of components which heat up intensively, with corresponding geometric construction. The great advantage of silicone is its almost uniform damping frequency over the entire range of use of the module which is to be aimed at, namely from −40 to +85 degrees Celsius. Thus the gas bag module according to the invention has a component which also has a good vibration neutralization at extreme temperatures.

Preferably, the gas generator is supported in the module by the elastic element so as to be neutralized with regard to vibrations. The gas generator represents a relatively heavy part of the module, which can act as vibration attenuator.

The elastic element surrounds the gas generator at least to some extent in peripheral direction, as is provided by one embodiment. This has the advantage that the damping and mounting takes place in all directions of the peripheral plane.

Alternatively, of course, the gas generator could also only be mounted at some points, for example on three or four buffer rings of silicone.

Provision is further preferably made that the gas generator has a ring flange and the elastic element has a groove to receive the ring flange. In this embodiment, the silicone was distinguished by its easy deformability, so that without a great action of force, the gas generator can be pressed into the groove.

A clamping device which is preferably provided fastens the element on the module side by a clamping action, the clamping device clamping the element in axial direction in the embodiment with the ring flange.

The invention further relates to a vehicle steering wheel with a gas bag module and several steering wheel sections, in which either the gas bag module or the steering wheel sections are mounted to the remainder of the steering wheel or on the steering wheel by means of an elastic element of silicone so as to be neutralized with regard to vibration. The steering wheel sections are for example the hub, the spoke and the steering wheel rim; the steering wheel rim in particular is to be neutralized with regard to vibrations from the hub, so that the element made of silicone is either to be arranged at the transition from the hub to the spoke, in the spoke or at the transition from the spoke to the steering wheel rim.

BRIEF DESCRIPTION OF THE DRAWINGS

FIG. 1 shows a cross-sectional view through a gas bag module according to the invention and FIG. 2 shows a view of a vehicle steering wheel according to the invention.

DETAILED DESCRIPTION OF THE PREFERRED EMBODIMENTS

Figure 1:
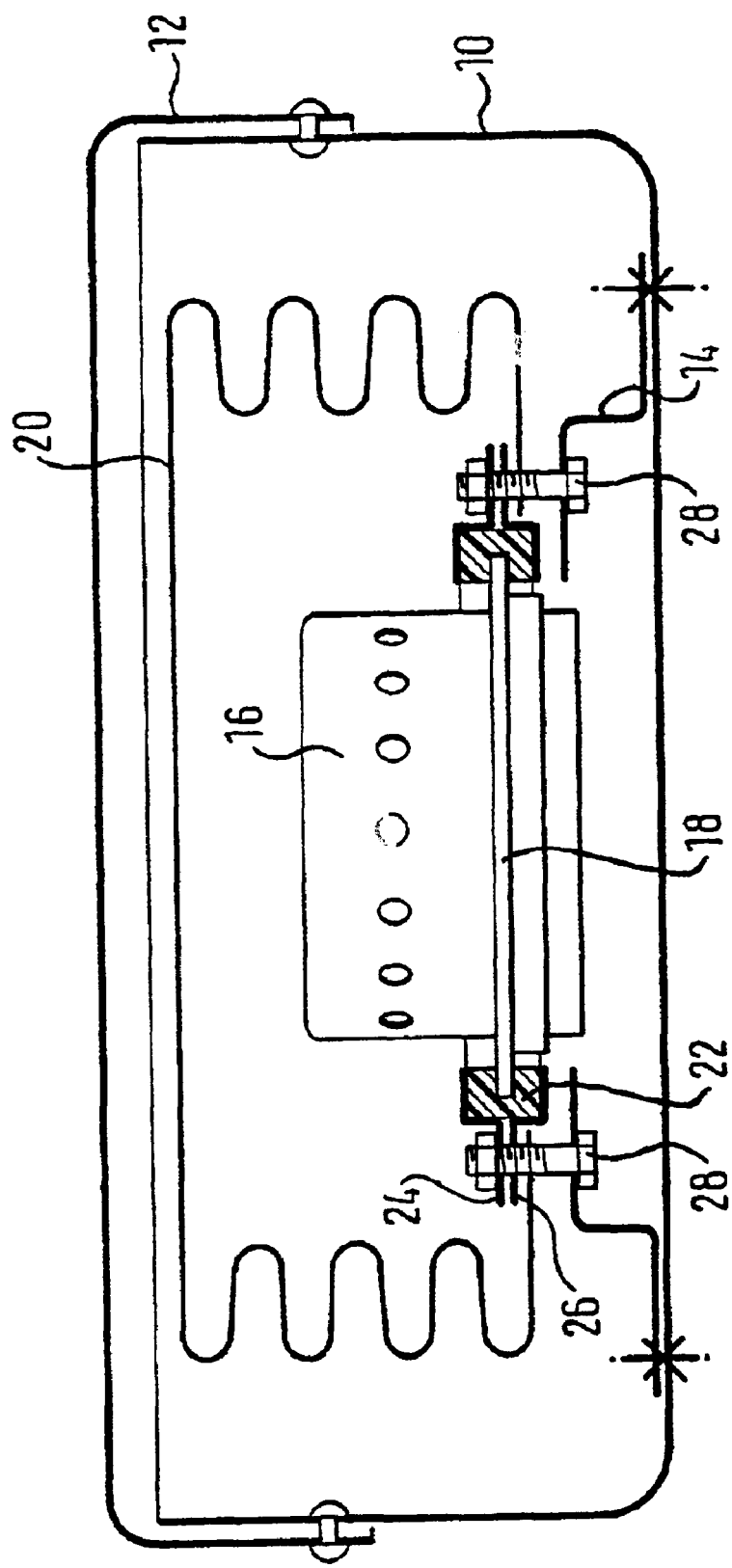

In FIG. 1 a gas bag module is shown, which is fastened to a vehicle steering wheel. The module consists of numerous components, a cup-shaped receiving housing 10 on which a covering cap 12 is fastened on the front face, a carrier element 14 in the form of a metal plate fastened to the base of the receiving housing 10, a gas generator 16 with a surrounding ring flange 18 and a gas bag 20.

One of the components, in the present case the gas generator 16, is mounted in the module so as to be neutralized with regard to vibration, which is made possible by an elastic element 22 consisting of silicone. The element 22 is a surrounding silicone ring with a surrounding groove radially on the inner side, which is filled completely by the ring flange 18. The elastic element 22 receives the gas generator 16 radially on the inner side and is mounted at its axial ends, i.e. in relation to FIG. 1 at the top and bottom, by a clamping device in the form of two metal plates 24, 26 on the module side, more precisely on the carrier element 14. The metal sheets each have a radially outer peripheral flange with openings in alignment, through which one screw/nut connection 28 each extends, these connections also projecting through openings in the carrier element 14. The gas bag, more precisely the edge of its so-called inflation opening, is clamped between the carrier element 14 and the metal plate 26. The module-side fastening of the element 22 by the metal plates 24, 26 therefore serves at the same time for securing the gas bag 20.

The elastic element 22 made of silicone has an approximately uniform damping frequency over the temperature range of −40 to +85 degrees Celsius, so that the gas generator is neutralized with regard to vibrations from the remainder of the module; thus, the vibrations on the steering wheel rim which is gripped by the driver can be kept very low.

However, other components of the gas bag module can also be mounted so as to be neutralized with regard to vibration, for example the unit of gas generator 16 and gas bag 20 or the unit of gas generator 16, gas bag 20 together with carrier element 14. In the latter embodiment, for example the elastic element or several elastic elements would be provided at the transition of the carrier element 14 to the base of the receiving housing 10.

Not only individual components of the gas bag module but also the entire gas bag module can be mounted on the steering wheel so as to be neutralized with regard to vibration by elastic elements 22', as shown schematically by FIG. 2.

In the embodiment according to FIG. 2, the components already mentioned in connection with FIG. 1, in so far as they have the same function, are given the reference numbers already introduced. In this embodiment, the entire module which has the reference number 30, is mounted in the cup-shaped hub 32 of a steering wheel so as to be neutralized with regard to vibration. The steering wheel has several steering wheel sections, namely the hub 32, spokes 34 and a surrounding steering wheel rim 36 which are connected with each other. Several elastic elements 22' made of silicone are arranged below a radial flange 38 of the receiving housing 10 and above a spoke projection 34. By means of the elements 22' the entire module 30 is mounted so as to be neutralized with regard to vibration. In FIG. 2 the carrier element is the flange 38 which is connected in one piece with the receiving housing 10.

Alternatively or additionally, the steering wheel sections can also be mounted so as to be neutralized with regard to vibration by elastic elements of silicone. Only by way of example, there are shown elastic elements 22" between the hub and the spokes 34, elements 22''' inside spokes 34 and elements 22"" at the transition of the spokes 34 to the steering wheel rim 36. The illustration according to FIG. 2 is to state that the elements 22 can be used at any desired points in the steering wheel for neutralization with regard to vibration of individual sections or parts thereof.

What is claimed is:

1. A gas bag module comprising:

a gas bag;

a gas generator having an annular flange;

a carrier element;

an annular elastic element having an annular inner surface and an opposite annular outer surface, said elastic element having a radial groove for receiving said annular flange of said gas generator, said radial groove extending from said annular inner surface toward said annular outer surface, said elastic element further having an upper surface and an opposite lower surface;

a first plate for engaging said upper surface of said elastic element;

a second plate for engaging said lower surface of said elastic element; and a fastener for securing said gas generator to said carrier element, said fastener being disposed adjacent said outer surface of said elastic element, said fastener further securing said elastic element between said first and second plates such that vibration between said gas generator and said carrier element is attenuated.

2. The gas bag module as defined in claim 1 wherein said fastener further secures said gas bag between said second plate and said carrier element.

3. The gas bag module as defined in claim 1 wherein said first plate includes a first portion for engaging said upper surface of said elastic element and a second portion for engaging said fastener, said first portion being disposed radially inward from said second portion.

4. The gas bag module as defined in claim 3 wherein said second portion of said first plate has an opening for receiving said fastener.

5. A gas bag module comprising:

a gas bag;

a gas generator having an annular flange;

a carrier element;

an annular elastic element having an annular inner surface and an opposite annular outer surface, said elastic element having a radial groove for receiving said annular flange of said gas generator, said radial groove extending from said annular inner surface toward said annular outer surface, said elastic element further having an upper surface and an opposite lower surface;

a first plate for engaging said upper surface of said elastic element;

a second plate for engaging said lower surface of said elastic element; and a fastener for securing said gas generator to said carrier element, said fastener being disposed adjacent said outer surface of said elastic element, said fastener further securing said elastic element between said first and second plates such that vibration between said gas generator and said carrier element is attenuated;

said first plate including a first portion for engaging said upper surface of said elastic element and a second portion for engaging said fastener, said first portion being disposed radially inward from said second portion, said second portion of said first plate having an opening for receiving said fastener, said opening of said first plate is disposed below and spaced from said upper surface of said elastic element.

* * * * *